United States Patent [19]
Tennis

[11] Patent Number: 5,456,298
[45] Date of Patent: Oct. 10, 1995

[54] PORTIONED METERING HEAD FOR FOOD PRODUCTS

[75] Inventor: Steve Tennis, Lincolnshire, Ill.

[73] Assignee: Handtmann Inc., Buffalo Grove, Ill.

[21] Appl. No.: 235,341

[22] Filed: Apr. 29, 1994

[51] Int. Cl.⁶ ..................................................... B65B 43/00
[52] U.S. Cl. ........................ 141/156; 141/160; 141/242; 141/243; 222/219
[58] Field of Search ..................................... 141/156, 157, 141/159–161, 237–239, 241–245; 222/219, 273

[56] References Cited

U.S. PATENT DOCUMENTS

| | | | |
|---|---|---|---|
| 1,676,377 | 7/1928 | Bergmann | 141/161 X |
| 2,727,657 | 12/1955 | Bagby | 141/242 X |
| 3,065,775 | 11/1962 | Keves | 141/160 X |
| 3,139,915 | 7/1964 | Minard | 141/160 X |
| 3,419,052 | 12/1968 | Morine | 141/156 X |
| 4,501,306 | 2/1985 | Chu et al. | 141/237 X |
| 4,730,648 | 3/1988 | Walter | 141/242 X |
| 4,953,600 | 9/1990 | Tribert et al. | 141/237 X |

Primary Examiner—J. Casimer Jacyna
Attorney, Agent, or Firm—Knechtel, Demeur & Samlan

[57] ABSTRACT

A device for providing a measured portion of food product on demand in which a portioned metering head has an inlet to receive the food product under pressure and an outlet to discharge the food product onto the food-receiving medium. There is a disk in the housing which has a disk passageway connecting the inlet and outlet passageways of the metering head. Within the disk passageway is a piston which can slide from one end to the other. By rotating the disk, the food product pushes against the piston causing it to push the food product previously within the disk passageway out into the outlet passageway of the metering head. The cycle repeats with the disk rotating 180°, once again positioning the piston adjacent to the inlet passageway. A photoelectric eye signals a control mechanism and connected air cylinder to rotate the disk each time a food-receiving medium is disposed under the metering head.

19 Claims, 3 Drawing Sheets

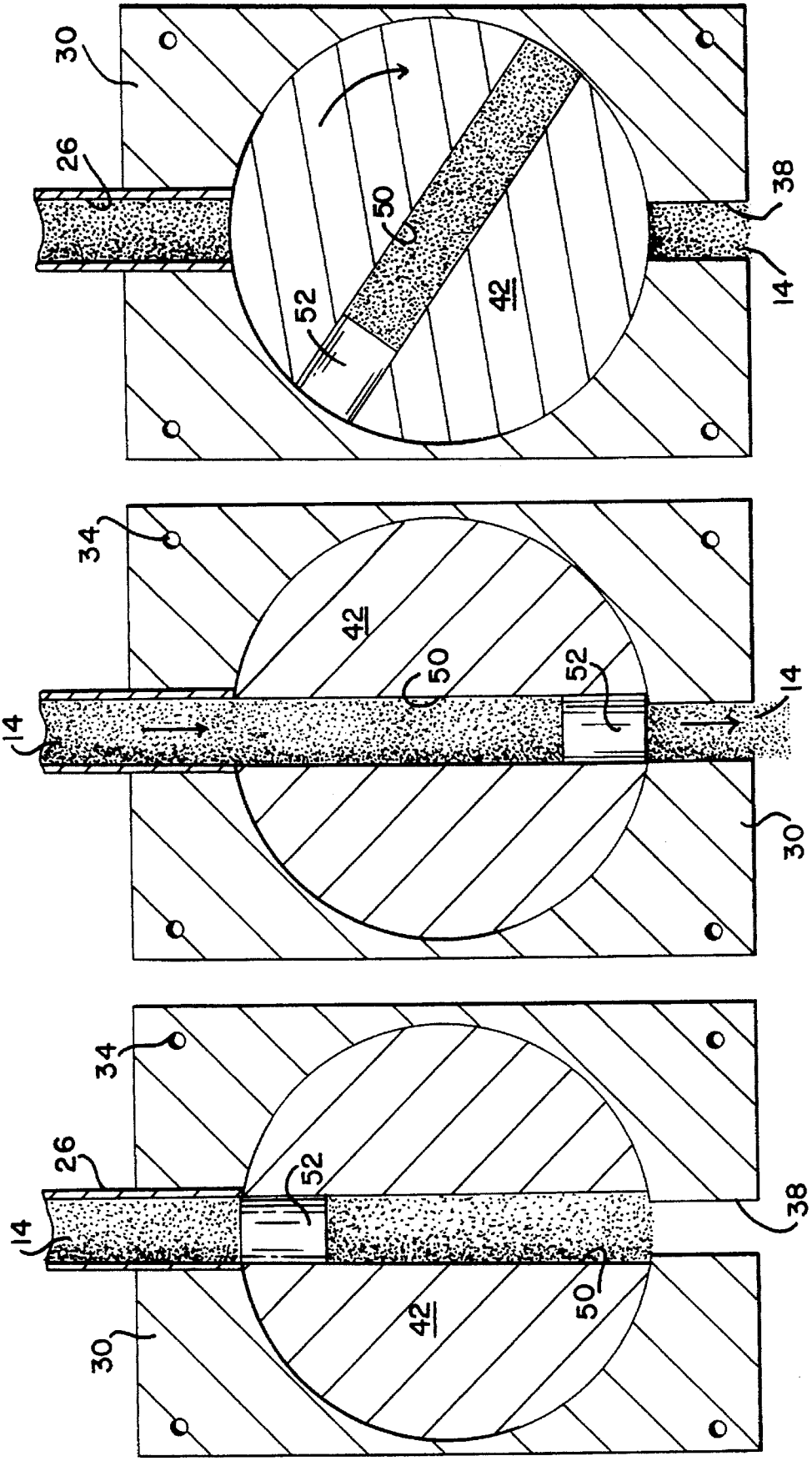

5,456,298

PORTIONED METERING HEAD FOR FOOD PRODUCTS

BACKGROUND OF THE INVENTION

This invention relates to apparatus for dispensing an accurately metered portion of a semi-fluid food product such as ground meat fillings, cream fillings or pastes. Machinery for the mass production of food products for these fillings are mixed and supplied in a semi-fluid or pasty state under pressure to a dispensing apparatus. When the food product is a meat food product, it is generally prepared in a grinder and then mixed in and dispensed from a machine called a "food pump" or "stuffer." The stuffer dispenses the food product under pressure for further processing or for dispensing into the finished food product.

Many prepared food products require an accurately measured amount of a filling to be inserted into a shell or casing. For example, pre-made Mexican food products have recently become increasingly popular. In a taco or enchilada, a pre-measured amount of ground meat must be dispensed into the taco shell or tortilla. Previously, this has been done by hand which is extremely expensive and time consuming. However, it is necessary that the amount of meat product be accurately maintained such that the shells or tortillas are not given too little meat, in which case the users would complain, or more than the guaranteed minimum amount of meat, in which case the manufacturer would have incurred excessive costs. In the past, it was always better to over-fill the shell or tortilla so that the customer would not complain. However, by over-filling, the manufacturer is losing profits.

Similarly, in bakery products which require a cream or jelly stuffing, various types of machinery have been introduced which will dispense a pre-measured amount of such food products. However, if the food product is extremely thick, chunky or granular, it often clogged the nozzles used to dispense such products. In fact, most of the prior art devices used for bakery fillings were designed for use with a creamy filling which did not have to address the problem of chunks of a food product such as ground meat. One such example is illustrated in U.S. Pat. No. 3,999,691 entitled "Cake Filler." This device was a dispensing apparatus for semi-fluid materials such as cream fillings for bakery products. However, as can be seen in this patent, it would easily clog with chunks of meat product and is not applicable for such fillings.

In U.S. Pat. No. 2,551,419, there is disclosed a filling machine for bakery products. A piston provides a pressure on the filling material which is disbursed out through a manifold. A series of ports which are valve-controlled disburse the product onto a conveyer belt. A shortcoming of this device is that it does not provide for accurate metering of the food product nor is it particularly well suited for a ground meat product.

Apparatus which is used to measure and dispense pre-determined amounts of a powdered material are illustrated in U.S. Pat. No. 3,656,518. The '518 patent does not provide for a means of receiving and ejecting a semi-fluid or paste-type food product and, therefore, would not be applicable to the present invention.

In the past, when attempting to increase production of filling taco shells or tortilla shells, the solution was to merely add more manual labor along the assembly line. This, however, is not cost efficient. Rather, it would be preferred if a mechanized system could be devised which automatically dispenses the proper amounts of the meat product into the shell upon demand. If still further production output is required, it would be advantageous if more conveyer lines could be added along with an apparatus which is positioned above the conveyer line to deposit the food product into the taco shell or tortilla. In the prior art, no such device had ever been constructed for a meat-type filling. Ideally, the device would be able to dispense an accurately pre-measured amount of meat product into the taco shell or tortilla such that the meat product is accurately positioned in the center of the receiving medium. Furthermore, the device should stop dispensing the product after the pre-determined amount is dispensed until the next receiving medium is in position to receive the food product. Thus, one wants to accurately dispense an amount of food product at a specific receiving location at a specific time. If additional production is required, beyond that which a single device can operate, parallel conveyer lines could be added all operating off of a central food supply apparatus.

Thus, it is an object of the present invention to provide a food metering head which can accurately and precisely dispense a pre-determined amount of food product. Related to this object is the object of providing such a metering head which will dispense the food product upon receipt of a signal. Also related to this object is the object of sending a signal to the metering head signifying the presence of the food receiving medium, such as a taco shell or tortilla, beneath the metering head.

Another object is the object of providing a metering head which works in conjunction with a food preparation device such as a stuffer or food pump which provides the food product at a constant pressure to the metering head. Related to this object is the object of providing the ability of adding parallel metering heads adjacent to each other such that additional conveyer lines can be placed next to each other as production demand requires. Related to this object is the object of providing a central manifold from the stuffer or food pump which provides the food product under a constant pressure to the metering heads. Related to this object is the object of providing a central manifold which dispenses the food product to one or more metering heads at a substantially constant pressure.

Still another object is the object of providing a metering head which can easily be adjusted to control the amount of food product to be dispensed.

Yet another object is the object of providing a metering head which is easy to disassemble and clean, and can be manufactured of materials suitable for the food industry.

SUMMARY OF THE INVENTION

Applicant's invention provides for a metering head which attaches to the output of a food pump. The food pump receives and dispenses the food product at a constant pressure into a manifold and maintains the food product within the manifold at a constant pressure. One or more inventive metering heads are attached along the manifold. The metering head is positioned above a conveyer belt on which are placed the food receiving medium such as taco shells or tortillas. At the proper instant as a taco shell passes beneath the metering head, a photo-electric eye senses the presence of the taco shell and sends a signal to a control circuit. The control circuit signals the metering head to operate to disburse the pre-determined amount of food product into the taco shell. The conveyer belt continues to move the food receiving medium until the next taco shell is in position under the metering head at which time the cycle repeats.

The metering head itself is extremely simple in operation. There is an input and output passageway which are aligned with each other. The food product enters the metering head at the inlet passageway. The inlet and outlet passageways are separated by a cylindrical chamber which has a disk disposed therein. The disk has a passageway passing diametrically through it. A piston slides within the disk passageway. When the disk passageway is in alignment with the inlet and outlet passageways, food product is dispensed through the outlet passageway because of the pressure pushing the meat product through the inlet passageway, disk passageway, and then through the outlet passageway. The piston acts as a valve to stop the food product when the pre-determined amount of food is disbursed. The piston also acts as the driving member which forces the food product out of the exit passageway. The disk is rotated 180° during each cycle. Thus, while the food product is being forced out of the exit passageway, the disk passageway is simultaneously being re-filled with food product. An air cylinder rotates the disk 180° for each cycle. The air cylinder operates in response to receiving a signal indicating that the food receiving medium is in position to receive the food product.

DESCRIPTION OF THE DRAWINGS

FIG. 3 is a cross-sectional view, with portions removed, taken along line 3—3 of FIG. 2 showing the disk passageway completely filled with food product just before the piston begins its travel forcing the food product out of the exit passageway.

FIG. 4 is a view similar to FIG. 3 except with the piston in its fully discharged position, the food product exiting the discharge passageway and the disk passageway being completely re-filled with new food product.

FIG. 5 is a view similar to FIGS. 3 and 4 with the disk being rotated from the position shown in FIG. 4 towards the position shown in FIG. 3 which is the start of a new cycle.

DESCRIPTION OF THE PREFERRED EMBODIMENT

Figure 1:
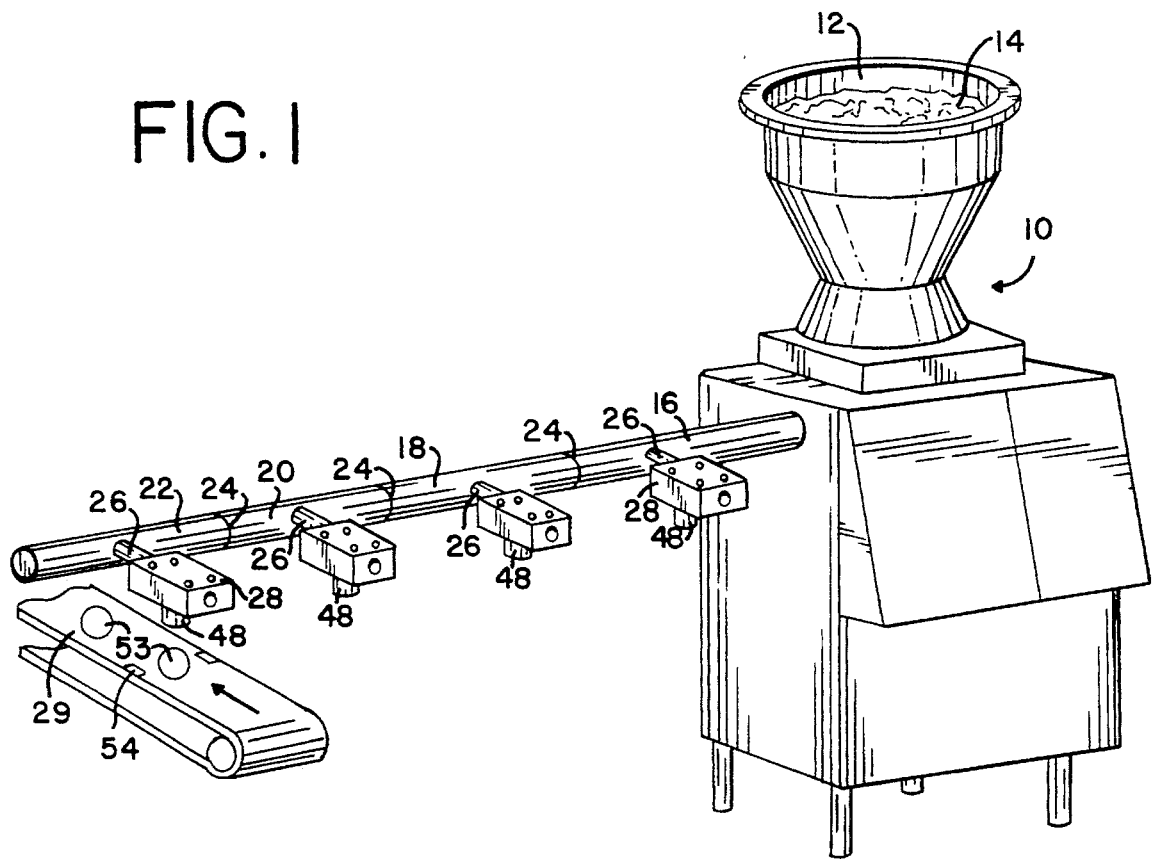
FIG. 1 is a perspective view of a food pump having its output connected to a series of metering heads, with one illustrative conveyor line beneath one metering head.

Turning first to FIG. 1, there is illustrated a perspective view of the inventive device in its customary environment. A vacuum filler 10 is a food pump of standard design such as a Handtmann vacuum filler manufactured by Albert Handtmann Maschinenfabrik GmbH & Co., Germany. There is a hopper 12 which receives a ground meat product 14 such as ground meat for hot dogs, sausages or tacos. The filler 10 agitates the meat product 14 and discharges it at a constant discharge pressure of about 56 psi into a main manifold 16. Additional sections of the main manifold 16 can be added such as illustrated by extension manifolds 18, 20 and 22. Each of the extension manifolds are connected by means of a quick disconnect clamp means 24 which joins the sections together. Tapping off the main manifold and each extension manifold is an inlet tube 26 which is connected to an inventive metering head 28. There is provided one portioned metering head 28 for each conveyor line 29 which would pass under the head 28. Thus, if additional capacity is required, additional manifold extensions are added onto the main manifold 16 and an extra metering head 28 will be connected via an inlet tube 26 to feed the extra conveyor line.

Figure 2:
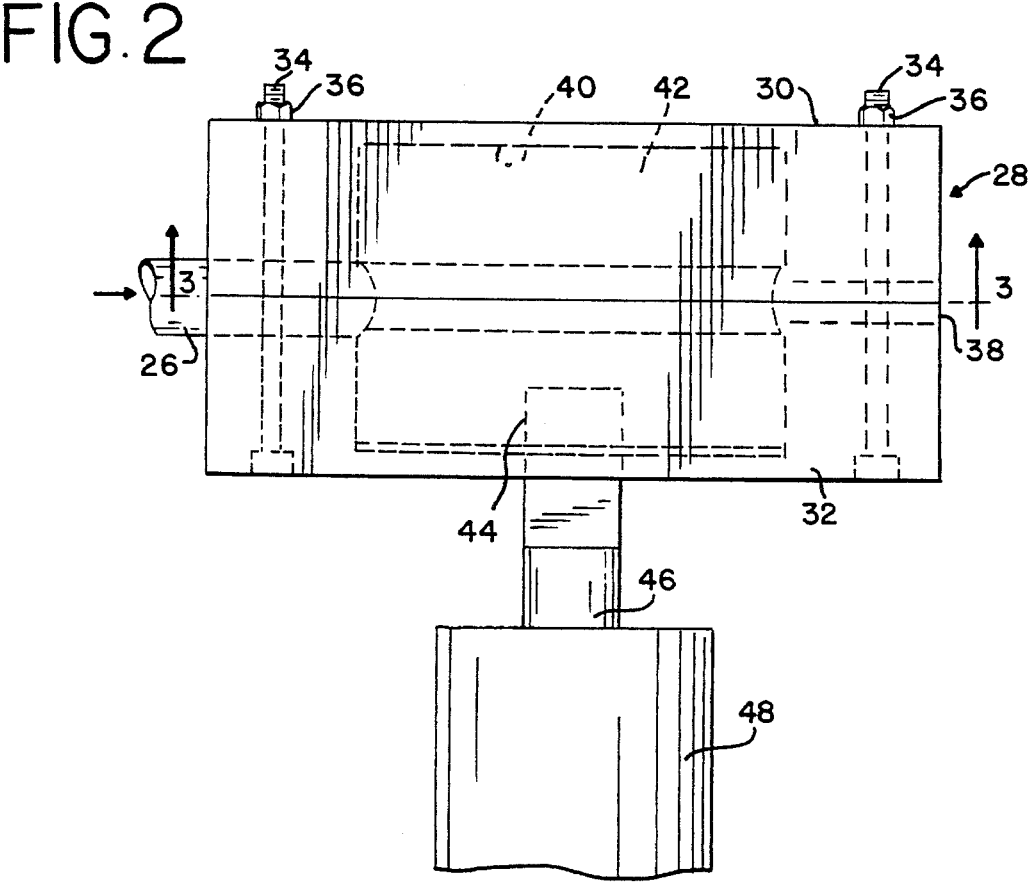
FIG. 2 is an enlarged view of one of the metering heads, with portions removed, showing how the air cylinder is connected to the cylindrical disk.

The components of the metering head 28 are illustrated in FIGS. 2 through 5. In FIG. 2 it is seen that the metering head 28 is comprised of a top half of the housing 30 and a bottom half of the housing 32. The two halves are bolted together by four screws 34 and nuts 36. A discharge passageway 38 is at the end of the metering head opposite the inlet tube 26 and is aligned with the inlet tube 26. The inlet tube 26 and discharge passageway 38 are connected by a bored out cylindrical passageway 40. Within the cylindrical passageway 40 is a disk 42 which is more clearly illustrated in FIGS. 3–5. The lower half of the disk has a square bore 44 which receives a square drive shaft 46 of an air cylinder 48. Thus, as the air cylinder 48 rotates the drive shaft 46, the disk 42 is simultaneously rotated.

Looking at the top half of the housing 30 in FIG. 3 we can see that the disk 42 has a disk passageway 50 extending diametrically across the disk 42. As seen in FIG. 3, the disk passageway 50 can connect the inlet tube 26 to the discharge passageway 38 when aligned with the inlet tube 26 and discharge passageway 38. Received within the disk passageway 50 is a piston 52 which slides from one end of the disk passageway 50 to the other. The diameter of the piston 52 is slightly larger than the discharge passageway 38 so that the piston 52 cannot leave the disk passageway 50 and enter into the discharge passageway 38.

As seen in FIG. 3, the food product 14 is supplied to the inlet tube 26 under pressure from the vacuum filler 10. With the disk positioned as it is illustrated in FIG. 3, the piston 52 is initially adjacent to the inlet tube 26. The pressure of the food product 14 pushes the piston 52 towards the discharge passage 38. The food product 14 will fill the disk passageway 50, as shown in FIG. 4. The amount of the food product in the discharge passageway is equal to the volume of the disk passageway less the volume occupied by the piston 52. Whatever food product was in the disk passageway at the beginning of the piston's travel towards the discharge passageway 38 will be expelled out through the discharge passageway. However, food product will remain in the discharge passageway from the end of the disk passageway 50 to the end of the housing 30.

When the disk 42 is caused to rotate, as shown in FIG. 5, the disk itself stops the flow of food product 14 from the inlet passageway 26. Furthermore, no additional food product 14 will be expelled from the discharge passageway 38. When the piston 50 is brought into alignment with the inlet tube 26, the pressure exerted by the vacuum filler 10 on the food product 14 will again force the piston 50 towards the discharge passageway 38. This will again cause the food product 14 which is inside the disk passageway to be expelled into the discharge passageway. If the discharge passageway 38 was filled with food product from the previous cycle, the amount of food product discharged will be exactly equal to the volume of the disk passageway less the volume occupied by the piston 52. In this way, an accurately amount of food product is disbursed through the discharge passageway 38. The volume of the disk passageway can be varied by adjusting the length of the piston. This can be accomplished by opening the housing 30, 32, removing the disk 42 and inserting a new sized piston 52. Alternatively, the piston can be made so that it is adjustable with the length of the piston capable of being lengthened or shortened.

In one device tested, the inlet passageway had a diameter of 1.50 inches; the disk passageway had a diameter of 1.0 inch; and the diameter of the discharge passageway was 0.75 inches. The disk had a diameter of 5 inches. Obviously, these dimensions can be varied to accommodate various volumes and types of food products. The housing 30, 32 and disk 42 are preferably made of plastic or stainless steel, which are materials acceptable for food applications.

Figure 6:
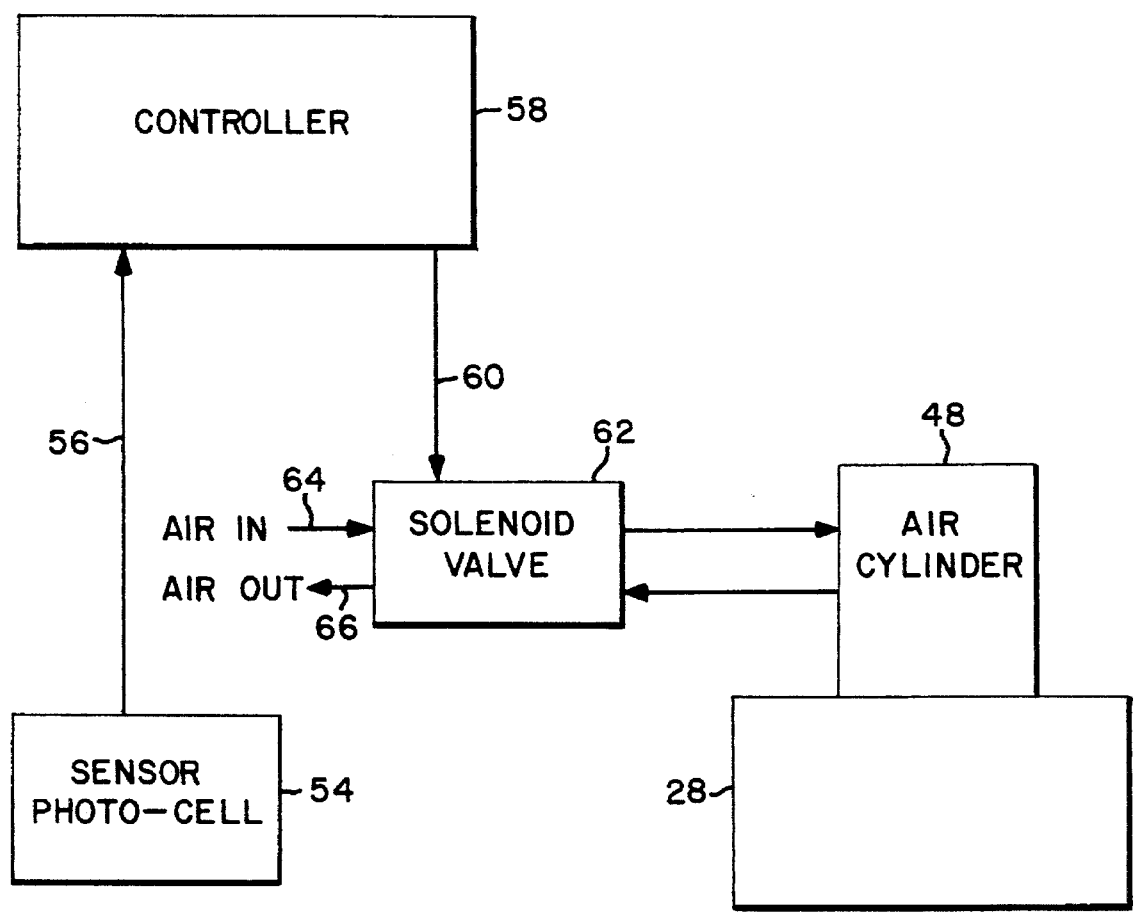
FIG. 6 is a schematic diagram of the control system which activates the air cylinder to rotate the cylindrical disk in the portioned metering head.

The control system to rotate the disk 42 is illustrated in the schematic drawing of FIG. 6. When a food receiving medium such as a taco shell or tortilla 53 moves along the conveyer and is positioned under the discharge passageway 38, a sensor such as a photocell 54 sends a signal over a wire 56 to a controller 58. The controller 58 can be a microprocessor or conventional electro-mechanical relay system. The controller 58 then sends a signal over wire 60 to a solenoid valve 62. The solenoid valve has an air input 64 and an air output 66. When the signal is received over the wire 60, it instructs the solenoid valve 62 to rotate the air cylinder 48 180°. The next time a signal is received over the wire 60, the solenoid valve can reverse and cause the air cylinder to rotate back 180°. In operation, it does not make any difference which direction the air cylinder rotates, as long as it rotates 180° with each signal it receives. With the air cylinder 48 connected to the metering head 28 by means of the square drive shaft 46, the disk 42 will rotate and the device will continue to discharge the food product 14 each time the photocell 54 detects the presence of the taco shell or tortilla 53. Thus, a pre-determined measured amount of food product will be discharged from the discharge passageway 38 onto the taco shell or tortilla.

Depending on the consistency and type of food product being dispensed, it may be necessary or advantageous to add a cutter at the end of the discharge passageway 38. This can be controlled by controller 58 to cut the food product at the end of the piston's 52 travel. However, for a ground meat filling, it was found that the food product easily drops out of the end of the discharge passageway onto the taco shell without the need of any cutter.

Thus, there has been provided a device for providing a measured portion of a food product which fully satisfies the aims, objects and advantages set forth above. It is evident that many alternatives, modifications and variations will be apparent to those skilled in the art. Accordingly, it is intended to embrace all such variations as fall within the spirit and scope of the appended claims.

What is claimed is:

1. A device for providing a measured portion of a ground food product on demand comprising:

a housing having a horizontally disposed inlet passageway and a horizontally disposed outlet passageway, the inlet and outlet passageways diametrically opposite each other, a cylindrical bore disposed within the housing between the inlet and outlet passageways, a disk received within the bore, the disk adapted for rotation about its perpendicular axis within the cylindrical bore, a horizontally disposed disk passageway having a defined volume diametrically disposed within the disk, the disk passageway adapted to be placed in alignment with the inlet and outlet passageways, piston means disposed within the disk passageway, the piston means reciprocating between the inlet and outlet passageways, drive means connected to the disk to cause the disk to rotate, control means operatively connected to the drive means to cause the drive means to operate responsive to a generated signal, input means to signal a demand for the measured portion of the food product, the input means sending the generated signal to the control means a positive pressure food pump for providing the food product under pressure to the inlet passageway to fill the inlet passageway, the food product further filling the disk passageway when the disk passageway is aligned with the inlet and outlet passageways, the pressure of the food pump on the food products forcing the piston means towards the outlet passageway thereby forcing the defined volume of food product previously within the disk passageway into the outlet passageway for further processing, the control means causing the drive means to rotate the disk to position the piston means adjacent to the inlet passageway to repeat the cycle thereby providing another defined volume of food product to the outlet passageway.

2. The device of claim 1 and further comprising stop means to restrain entry of the piston means into the outlet passageway.

3. The device of claim 2 wherein the inlet, outlet and disk passageways are all cylindrical.

4. The device of claim 3 wherein the stop means is provided by the outlet passageway being of a smaller diameter than the disk passageway.

5. The device of claim 1 wherein the drive means causes the disk to rotate 180° each time the control means receives the generated signal.

6. The device of claim 1 wherein the input means is a photoelectric sensor which senses the presence of a food receiving receptacle under the outlet passageway, the photoelectric sensor sending the generated signal to the control means to activate the drive means to rotate the disk resulting in the defined volume of food being discharged from the outlet passageway onto the food receiving receptacle.

7. The device of claim 1 wherein the defined volume of the disk passageway can be adjusted by changing the size of the piston means.

8. The device of claim 1 wherein the housing is comprised of top and bottom portions, the two portions separable from each other to allow removal of the disk and piston for cleaning or replacement.

9. The device of claim 1 wherein the drive means comprises an air cylinder.

10. The device of claim 1 and further comprising a second device identical to the first device and mounted adjacent to the first device, the means for providing the food product under pressure, providing the food product to both devices, with each device operating independently of the other.

11. A device for providing a measured portion of a ground food product on demand comprising:

a housing having horizontally disposed inlet means for receiving the food product under pressure and horizontally disposed outlet means to discharge the food product, the inlet and outlet means diametrically opposite from and aligned with each other, a positive pressure food pump for providing the food product under pressure to the inlet means, a cylindrical bore disposed between the inlet and outlet means, a disk disposed within the bore, the disk adapted for rotation about its perpendicular axis within the cylindrical bore, a horizontally disposed disk passageway having a defined volume diametrically disposed within the disk and extending from one circumferential edge of the disk to an opposite circumferential edge, the disk passageway adapted to be placed into and out of alignment with the inlet and outlet passageways by rotating the disk, piston means disposed within the disk passageway, the piston means reciprocating from one end of the disk passageway to the other, drive means connected to the disk for rotating the disk to selectively place the disk passageway into alignments with the inlet and outlet passageways, control means operatively connected to the drive means to cause the drive means to operate responsive to a generated signal, input means to signal a demand for the measured portion of the food product, the input means sending the generated signal to the control means, whereby the food product under pressure fills the inlet passageway, forces the piston towards the outlet passageway, fills the disk passageway as the piston is pushed towards the outlet passageway, the piston forces the defined volume of food product previously in the disk passageway into the outlet passageway, with the control means causing the drive means to rotate the disk to again position the piston means adjacent to the inlet passageway to repeat the cycle thereby providing another defined volume of food product to the outlet passageway.

12. The device of claim 11 and further comprising stop means to restrain entry of the piston means into the outlet passageway.

13. The device of claim 11 wherein the drive means causes the disk to rotate 180° each time the control means receives the generated signal.

14. The device of claim 11 wherein the input means is a photoelectric sensor which senses the presence of a food receiving receptacle under the outlet passageway, the photoelectric sensor sending the generated signal to the control means to activate the drive means to rotate the disk resulting in the defined volume of food being discharged from the outlet passageway-onto the food receiving receptacle.

15. The device of claim 11 wherein the defined volume of the disk passageway can be adjusted by changing the size of the piston means.

16. The device of claim 11 wherein the inlet, outlet and disk passageways are all cylindrical.

17. The device of claim 16 wherein the stop means is provided by the outlet passageway being of a smaller diameter than the disk passageway.

18. The device of claim 11 wherein the housing is comprised of top and bottom portions, the two portions separable from each other to allow removal of the disk and piston for cleaning or replacement.

19. The device of claim 11 wherein the drive means comprises an air cylinder.

* * * * *